Nov. 30, 1965   G. GUNDERSON   3,220,678
FOLDABLE CORD HOLDER FOR ELECTRIC IRONS
Filed Sept. 2, 1964   3 Sheets-Sheet 1

INVENTOR.
GUSTAV GUNDERSON
BY
*Polachek & Saulsbury*
ATTORNEYS

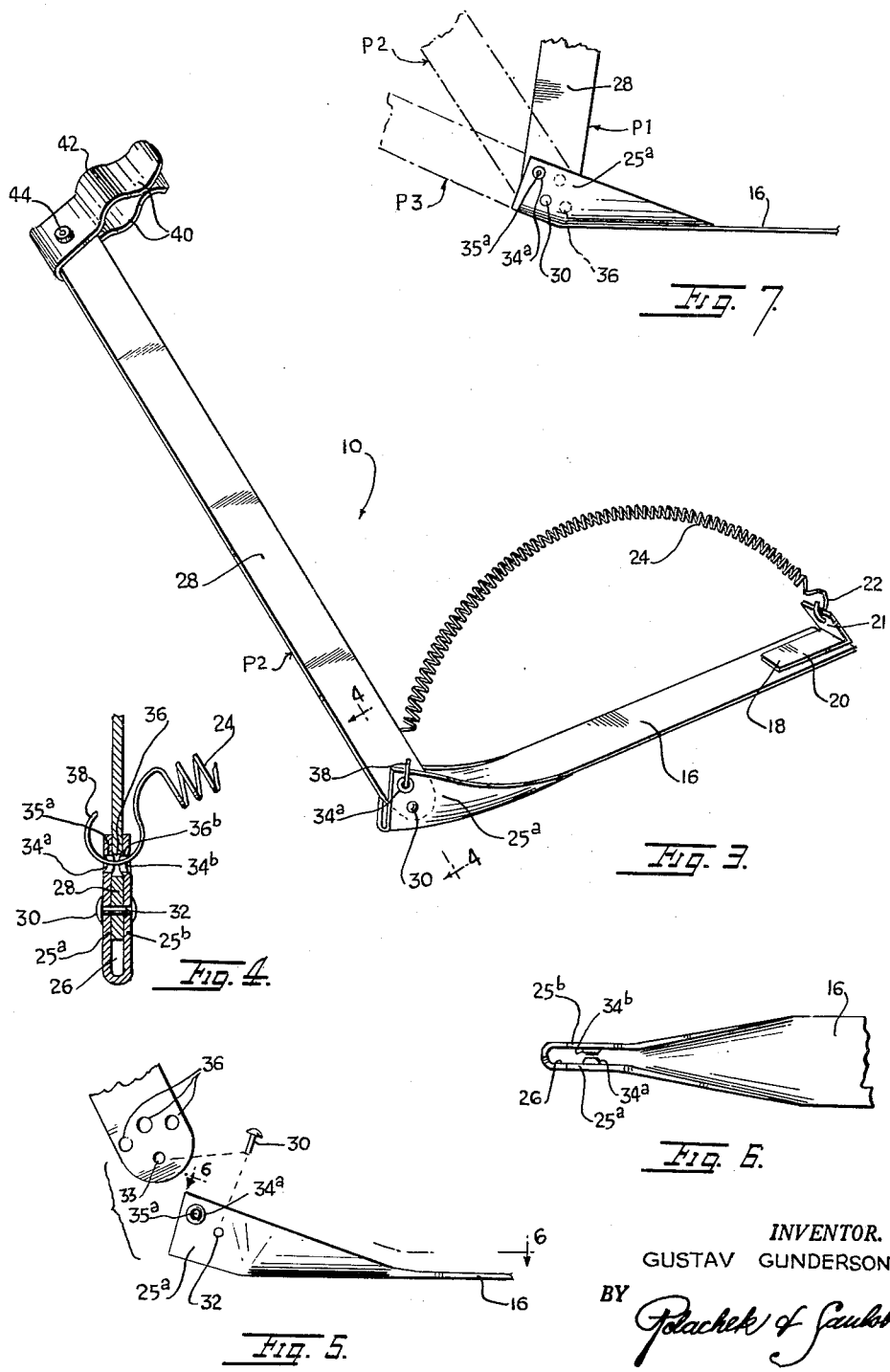

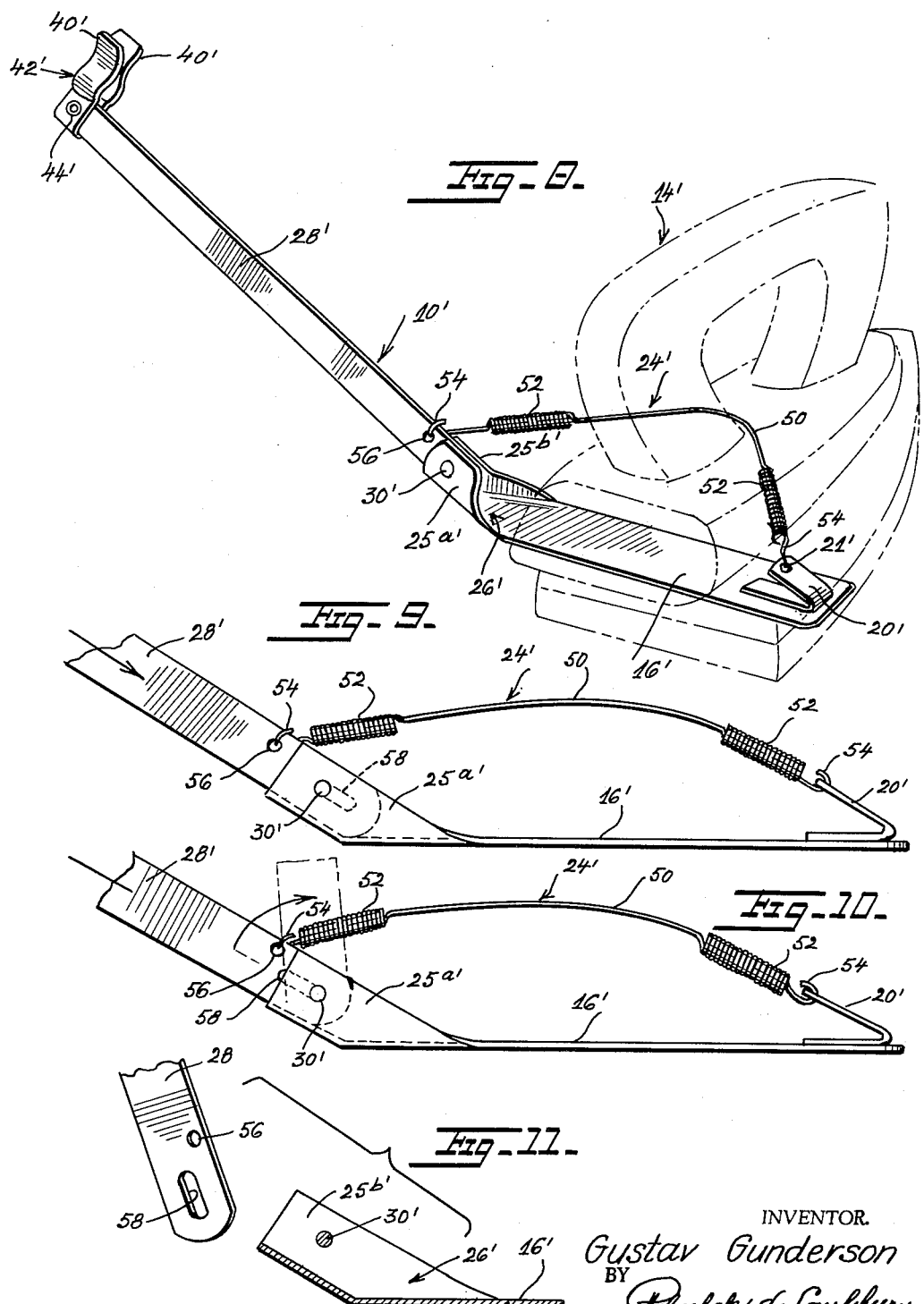

United States Patent Office 3,220,678
Patented Nov. 30, 1965

3,220,678
FOLDABLE CORD HOLDER FOR ELECTRIC IRONS
Gustav Gunderson, 134 Clay St., Tremont, Pa.
Filed Sept. 2, 1964, Ser. No. 394,016
2 Claims. (Cl. 248—52)

This invention relates to improvements in electric cord holders and supports used in connection with electric irons.

A principal object of the invention is to provide a cord holder device which is connectable to an electric iron by means of an improved support including an adjustable support arm and clamp.

Another object is to provide a cord holder device of the character described including a spring and crossbar attachment to the electric iron arranged to avoid interference with the iron while in use or while standing on its heel.

A further object of the invention is to provide a cord holder device as described, which can be constructed economically with a minimum of parts, but which will nevertheless be strong and durable.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 3 is a perspective view of the cord holder.

FIG. 4 is an enlarged fragmentary sectional view taken on line 4—4 of FIG. 3.

FIG. 5 is an exploded fragmentary perspective view of parts of the cord holder.

FIG. 6 is a top plan view of part of a crossbar employed in the cord holder.

FIG. 7 is a side elevational view of part of the cord holder showing a portion of the cord support arm and crossbar.

FIG. 8 is a perspective view of a modified form of cord holder shown in operative position on an electric iron, the iron being shown in dash lines.

FIG. 9 is a side elevational view of the bottom of the cord holder of FIG. 8, shown in relaxed condition.

FIG. 10 is a similar view showing the cord supporting arm in moved position, in dash lines.

FIG. 11 is a disassembled part elevational and part section view showing the joint between the cord supporting arm and the crossbar.

Figure 1:
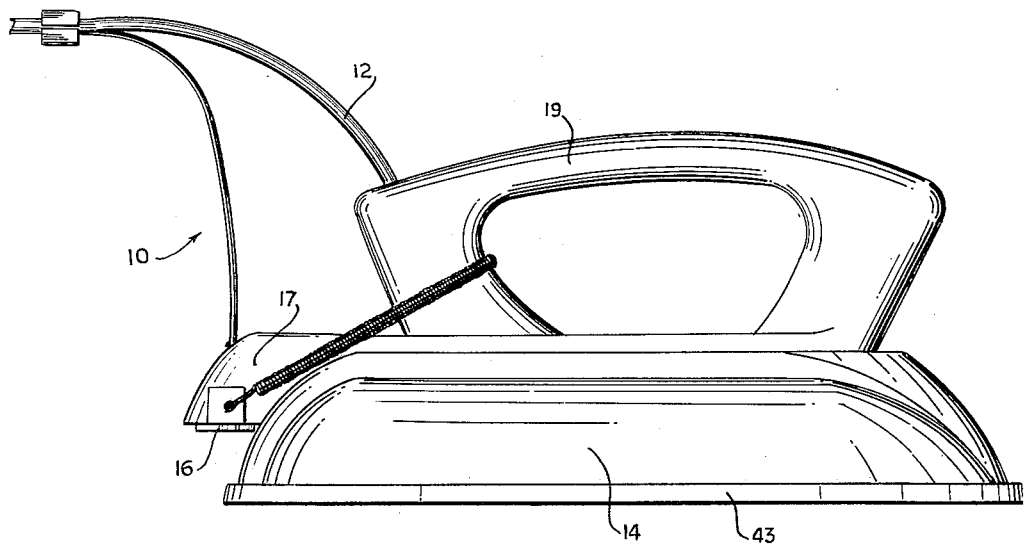
FIG. 1 is a side elevational view of the cord holder shown mounted on an electric iron.

Referring to the drawings, there is shown in FIGS. 1–7 the holder device 10 for the electric cord 12 of an electric iron 14. The cord holder 10 includes a crossbar 16 which is a flat, rigid metal plate or strip. At one end of the bar is secured by rivets 18 or welds an angle bracket 20 having an opening 21 in which is engaged a loop 22 at one end of a coil spring 24.

At its other end, the bar 16 is folded up at opposite sides and pinched together to define a channel 26 between opposing corners 25$^a$, 25$^b$ of the end of the bar. Rotatably inserted in the channel 26 between corners 25$^a$, 25$^b$ is the lower end of a cord support arm 28. This arm is a flexible flat metal strip. The lower end of the arm 28 is engaged by a rivet 30 passing between registering holes 32 in the corners 25$^a$, 25$^b$ and a hole 33 at the end of the arm 28. Just above holes 32 in the corners 25$^a$, 25$^b$ are aligned dimples 34$^a$, 34$^b$ pressed inwardly of the corners with aligned holes 35$^a$, 35$^b$ centrally located in the dimples. These dimples can snap into holes 36 in turn as arm 28 is rotated. The dimples cooperate with holes 36 in a detent arrangement. The dimples project into one of a plurality of spaced holes 36 provided in the arm 28 just above hole 33; see FIGS. 4 and 5. The holes 35$^a$, 35$^b$ are then disposed in registration with one of the holes 36 in arm 28.

Figure 2:
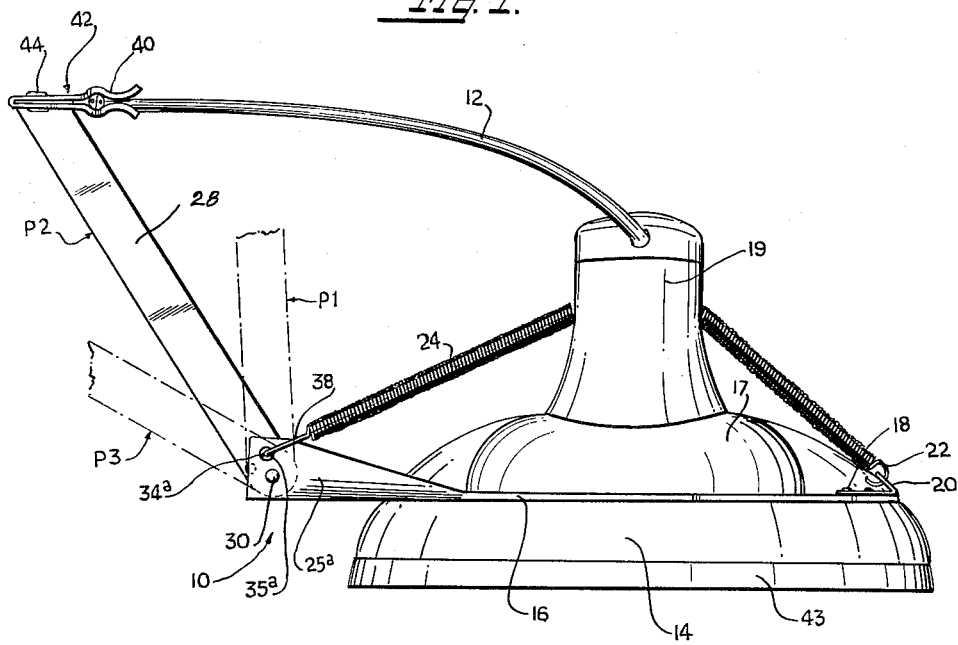
FIG. 2 is a rear elevational view of the cord holder on the iron.

The arm 28 is rotatable on rivet 30 and can be fixed in any one of three angularly spaced positions P1, P2, or P3 indicated by solid and dotted lines in FIGS. 2 and 7. In FIGS. 2 and 3 the arm 28 is in the inclined center position P2. In FIG. 7, arm 28 is shown in solid lines in the upright position P1, while position P3 is the lowermost angular dotted line position indicated in FIGS. 2 and 7. The projections or dimples 34$^a$, 34$^b$ engage in one or another of the three holes 36 for supporting the arm 28 in any one of the three positions P1, P2 or P3.

The coil spring 24 has a loop 38 at its other end which can be detachably engaged in registering holes 35$^a$, 35$^b$ and one of holes 36. The loop 38 then locks the arm 28 in the selected angular position P1, P2, or P3 as clearly shown in FIGS. 2, 3, and 4.

The electric cord 12 of the electric iron is engaged between fingers 40 of a spring clip 42 secured by a rivet 44 to the outer or upper end of the arm 28. The crossbar 16 engages under the heel 17 of the electric iron to stabilize the device while the coil spring extends in tension around the rear end of the handle 19 of the electric iron to hold the device securely on the iron.

It will be noted in FIGS. 1 and 2 that the arm 28 is turned at an angle laterally of the electric iron and is bent rearwardly at its upper end so that the clip 42 engages the cord in a desired elevated lateral position away from the sole plate 43 of the electric iron.

The arm is shown in position P2 in solid lines in FIG. 2 but could be placed closer to the iron in upper dotted line angular position P1 or could be placed further from the iron in lateral lowered position P3 depending on the shape of the iron, position of the cord, shape of the handle, etc.

The spring loop 38 can easily be detached from the corners 25$^a$, 25$^b$ and lower end of the arm 28 for removing the device 10 from the electric iron. The spring can be stretched readily to accommodate the cord holder to electric irons of different sizes.

The device 10 can be manufactured inexpensively. It is made up of few parts. It operates efficiently and will provide long trouble-free service.

In FIGS. 8 to 11, inclusive, a modified form of cord holder 10′ is shown. The cord holder 10′ differs from the holder 10 merely in the construction of the spring member 24′ and its point of attachment to the cord supporting arm 28′, and in the connection between the arm 28′ and the cross bar 16′. In holder 10′ the spring member 24′ consists of an elongated round spring wire 50 twisted around in the form of coils at each end as indicated at 52, 52, the outer free ends of the coils terminating in hooks or loops 54, 54. The hook 54 at one end of the spring member is hooked through the opening 21′ in bracket 20′ and the hook 54 at the other end is hooked through a hole 56 formed in the cord supporting arm 28′ adjacent the bottom end thereof.

In holder 10′, the lower end of the arm 28′ is rotatably and slidably mounted between and in frictional engagement with the corners 25$^{a\prime}$ and 25$^{b\prime}$ of the channel 26′ of the cross bar 16′. The lower end of the arm 28′ is formed with an elongated closed slot 58 and extending through opposed holes in the corners 25$^{a\prime}$ and 25$^{b\prime}$ and through the slot 58, there is a rivet or pin 30′.

A spring clip 42′ is mounted on the top end of arm

28' by means of a rivet 44' and is formed with spring fingers 40', 40'.

In use, the cord holder 10' is attached to the electric iron 14' and functions in a manner similarly to the cord holder 10, the slidable mounting of the arm 28' permitting more flexibility in attaching and accommodating the holder to electric irons of various sizes.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A cord holder device for an electric iron having a looped handle, a rearwardly extending heel, and an electric cord attached to one end of the handle, comprising a flexible arm, a spring clip at one end of the arm for detachably engaging said cord, a flat crossbar engageable under the heel transversely of the iron and extending outwardly thereof at opposite sides of the iron, a coil spring secured at one end to one end of the crossbar and engageable around the handle of the iron at the rear end of the handle, the other end of said crossbar having its corners pinched together to define a channel, a rivet pivotally securing the other end of said arm to the other end of the crossbar in said channel, the other end of the arm having a plurality of holes near the rivet, the other end of the crossbar having aligned other holes in said corners, each of said holes in said arm being selectively registrable with the aligned other holes in said corners for disposing the arm in any one of a plurality of positions angularly to said crossbar, and a loop at the other end of the coil spring engageable in registering holes of the arm and crossbar to anchor the spring in tension around the rear end of the handle, while the crossbar engages under said heel, and the said loop locks the arm in an angular position laterally of the iron and crossbar to support the cord in an elevated position angularly to and laterally of the iron, said corners at the other end of said crossbar having projections formed at the aligned other holes extending inwardly of said channel to engage in a selected one of the holes in the other end of the crossbar for supporting the arm in said one position angularly of the crossbar.

2. A cord holder device for an electric iron having a looped handle, a rearwardly extending heel, and an electric cord attached to one end of the handle, comprising a flexible arm, a spring clip at one end of the arm for detachably engaging said cord, a flat crossbar engageable under the heel transversely of the iron and extending outwardly thereof at opposite sides of the iron, a coil spring secured at one end to one end of the crossbar and engageable around the handle of the iron at the rear end of the handle, means pivotally securing the other end of said arm to the other end of the crossbar to rotate in a plane perpendicular to the plane of the crossbar, and detent means on said arm and crossbar for supporting said arm in any one of a plurality of positions angularly to said crossbar, said arm and crossbar having holes on said detent means for receiving and engaging the other end of the coil spring to tension said spring and to lock the arm in a selected angular position to the crossbar.

References Cited by the Examiner
UNITED STATES PATENTS

| | | | |
|---|---|---|---|
| 1,516,781 | 11/1924 | Nylen | 248—52 |
| 2,125,188 | 7/1938 | Lieberman | 248—51 |
| 2,205,139 | 6/1940 | Gunderson | 248—52 |
| 2,440,045 | 4/1948 | Gunderson | 248—52 |
| 2,470,233 | 5/1949 | Boye | 160—349 |
| 2,633,853 | 4/1953 | Smereck | 131—240 |
| 2,727,708 | 12/1955 | Lorenzen | 248—47 |
| 2,880,047 | 3/1959 | Haag | 248—188.8 |

CHANCELLOR E. HARRIS, *Primary Examiner.*

FRANK L. ABBOTT, CLAUDE A. LE ROY, *Examiners.*